United States Patent
Chow et al.

(10) Patent No.: US 7,072,300 B1
(45) Date of Patent: Jul. 4, 2006

(54) ACTION TAG GENERATION WITHIN A NETWORK BASED ON PRIORITY OR DIFFERENTIAL SERVICES INFORMATION

(75) Inventors: Peter Ka-Fai Chow, San Jose, CA (US); Shr-Jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 864 days.

(21) Appl. No.: 09/814,812

(22) Filed: Mar. 23, 2001

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)

(52) U.S. Cl. .............. 370/236; 370/235; 370/413; 370/412; 370/392; 370/389

(58) Field of Classification Search ........ 370/235, 370/236, 386–389, 395.1, 395.42, 395.21, 370/395.4, 395.31, 396, 422, 411–413, 357, 370/359, 363, 360, 392, 252, 400, 471, 474, 370/475; 709/240, 220, 242, 245, 213–216, 709/223–229, 249, 250, 238, 231; 340/825.5, 340/825.51; 711/149, 150, 151, 158, 147, 711/169, 170
See application file for complete search history.

(56) References Cited

U.S. PATENT DOCUMENTS

| | | | | |
|---|---|---|---|---|
| 5,455,825 | A * | 10/1995 | Lauer et al. | 370/413 |
| 5,583,858 | A * | 12/1996 | Hanaoka | 370/392 |
| 5,859,846 | A * | 1/1999 | Kim et al. | 370/395.62 |
| 6,115,378 | A * | 9/2000 | Hendel et al. | 370/392 |
| 6,289,011 | B1 * | 9/2001 | Seo et al. | 370/388 |
| 6,463,470 | B1 * | 10/2002 | Mohaban et al. | 709/223 |
| 6,501,757 | B1 * | 12/2002 | Kamaraj et al. | 370/395.41 |
| 6,707,817 | B1 * | 3/2004 | Kadambi et al. | 370/390 |
| 6,707,818 | B1 * | 3/2004 | Kadambi et al. | 370/391 |
| 6,744,767 | B1 * | 6/2004 | Chiu et al. | 370/395.21 |
| 6,782,428 | B1 * | 8/2004 | Gleeson et al. | 709/233 |
| 6,810,037 | B1 * | 10/2004 | Kalapathy et al. | 370/392 |
| 6,850,521 | B1 * | 2/2005 | Kadambi et al. | 370/389 |

(Continued)

FOREIGN PATENT DOCUMENTS

EP 0652685 A2 5/1995

(Continued)

OTHER PUBLICATIONS

S. Blake et al., "An Architecture for Differentiated Services", Dec. 1998, 31 pages.

(Continued)

Primary Examiner—Wellington Chin
Assistant Examiner—Jamal A. Fox
(74) Attorney, Agent, or Firm—Harrity Snyder LLP

(57) ABSTRACT

A multiport switch includes an action generator that creates action tags describing how data frames received by the switch are to be forwarded. A port filter generates policy equations and a differential services code point (DSCP) signal for the received packets. A decoder and an action memory in the action generator choose the highest priority policy equation and use the policy equation to look up priority information for the data frame. A state machine in the action generator receives the DSCP signal. A result tag interface receives a DSCP field from the state machine and the priority information from the action memory. Based on these signals, the result tag interface constructs the final action tag.

19 Claims, 6 Drawing Sheets

U.S. PATENT DOCUMENTS

| | | | |
|---|---|---|---|
| 6,859,454 B1 * | 2/2005 | Bowes | 370/366 |
| 6,865,153 B1 * | 3/2005 | Hill et al. | 370/230.1 |
| 6,865,185 B1 * | 3/2005 | Patel et al. | 370/412 |
| 2002/0136217 A1 * | 9/2002 | Christensen | 370/393 |

FOREIGN PATENT DOCUMENTS

| | | |
|---|---|---|
| WO | WO 00/56024 | 9/2000 |

OTHER PUBLICATIONS

K. Nichols et al., Network Working Group Memo: "Definition of the Differentiated Services Field (DS Field) in the IPv4 and IPv6 Headers", Dec. 1998, pp. 1-18.

S. Blake et al., Network Working Group Memo: "An Architecture for Differentiated Services", Dec. 1998, pp. 1-32.

* cited by examiner

ACTION TAG GENERATION WITHIN A NETWORK BASED ON PRIORITY OR DIFFERENTIAL SERVICES INFORMATION

TECHNICAL FIELD

The present invention relates generally to communication systems and methods and, more particularly, to systems and methods for forwarding packets having differing service classes.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Some conventional network switches provide different classes of service for packets they forward. The particular class of service to be provided to a packet may be identified within the header of the packet in a field reffered to as the differentiated services field. Differentiated service enhancements to the standard Internet protocol enable scalable service discrimination without the need for per-flow state and signaling at every switch in the network. Through the differentiation services field, a switch can determine priority and other forwarding information for a packet.

Some packets may not have a differentiated services field. Instead, in their header portion, the packet may include a direct indication of the priority level that the switch should assign to the packet. Alternatively, or additionally, the switch may apply predetermined policy equations to the packet to determine how the packet should be handled. As an example of a policy equation, the switch may block all packets from a certain IP address.

There is a need in the art to be able to efficiently forward packets based on embedded differentiated services codes, priority fields, and/or policy equations.

DISCLOSURE OF THE INVENTION

Systems and methods consistent with the present invention address this and other needs by efficiently creating action tags that describe forwarding properties for packets received in a packet-based network.

Advantages and features of the present invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device. The network device includes input ports configured to receive data frames. A port filter generates policy information and class of services information for each of the received data frames. A memory stores action tags corresponding to the policy information. A result tag interface generates a final action tag based on the class of service information and the action tags corresponding to the policy information.

A method consistent with the present invention identifies priority level information for a data frame received by a network device. The method includes programming a memory with priority level information corresponding to priority levels based on network policy equations and accessing the memory to identify the priority level information associated with received data frames. Differentiated services code point (DSCP) data is extracted from the received data frames and a final action tag generated for the received data frames based on the DSCP data and the priority level information. Finally, the data frames are transmitted from the network device based on the generated final action tag.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
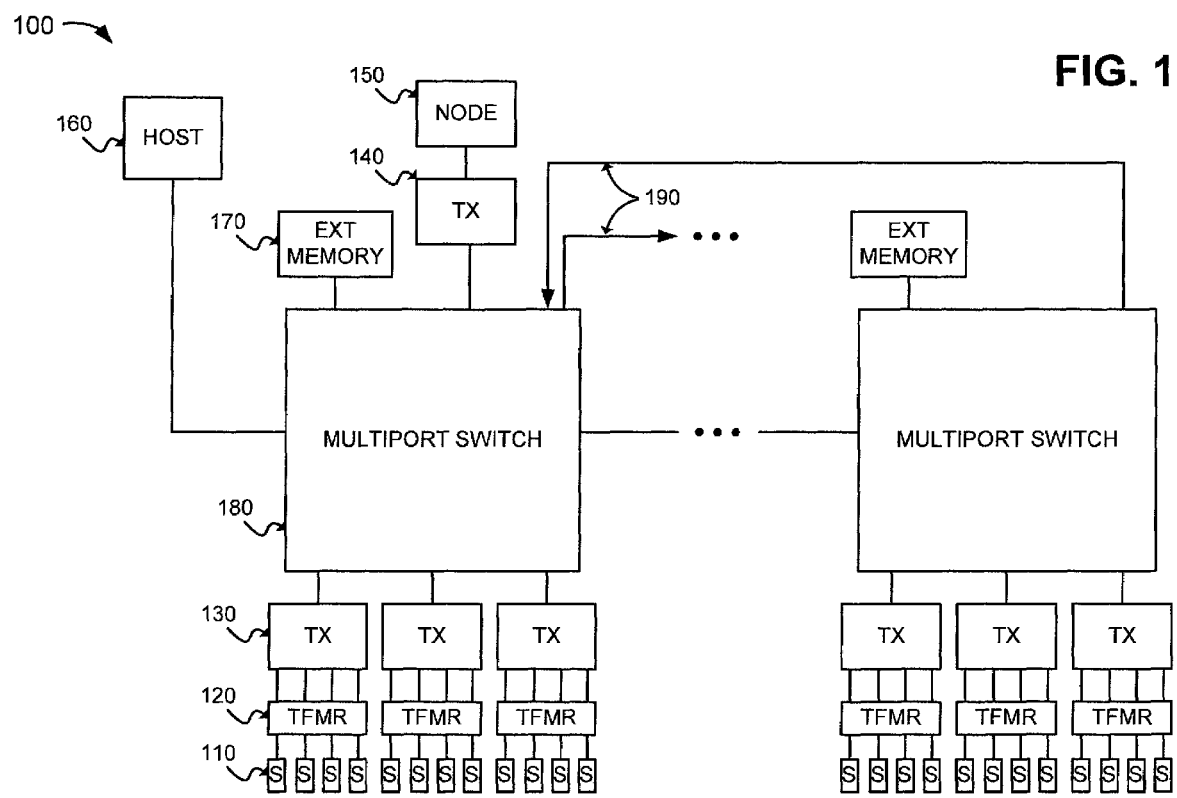
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
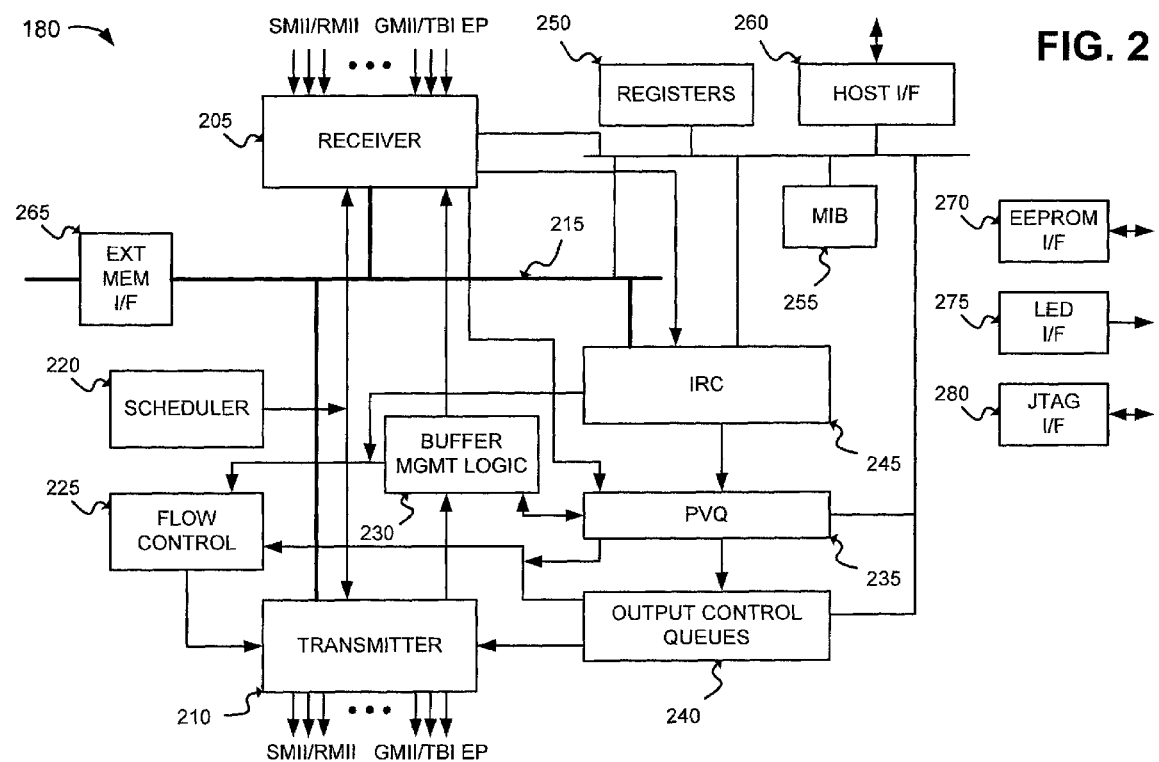
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface (I/F) 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Action Tag Generation

As described herein, an action tag generator is located between a port filter in receiver 205 and the PVQ 235. The action tag generator creates action tags for received data frames that indicate how the switch is to handle forwarding of the data frames. The action tag generator can support action tags based on priority or based on the differential services field of the data frame.

Figure 3:
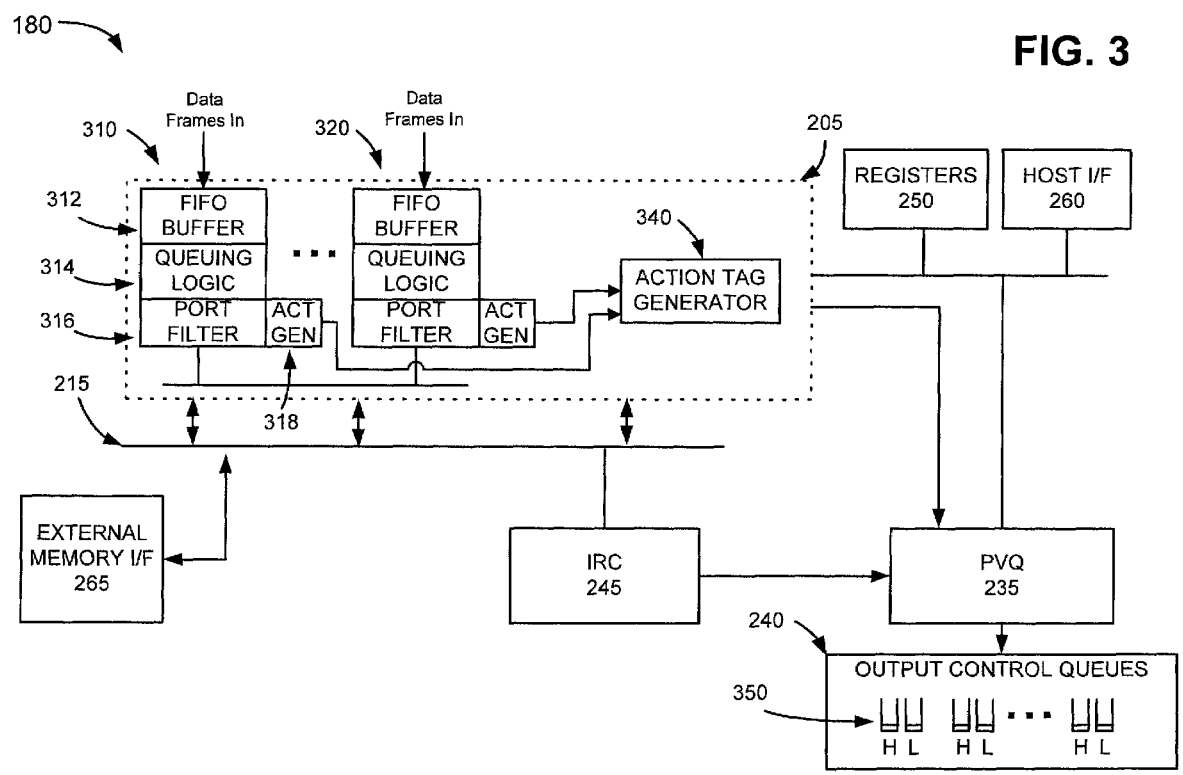
FIG. 3 is a diagram of a portion of the multiport switch of FIG. 2 according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the output control queues 240, the IRC 245, the registers 250, the host interface 260, and the external memory interface 265. The receiver 205 may include MAC modules 310 and 320 corresponding to input ports 1 through N, respectively, and an action tag generator 340. Each MAC module may include a receive FIFO buffer 312, queuing logic 314, a port filter 316, and an action generation component 318.

The receive FIFO buffer 312 may include a FIFO that temporarily buffers data frames received on the corresponding input port. The queuing logic 314 may include logic responsible for transferring data frames from the receive FIFO buffer 312 to the external memory 170 (FIG. 1) via the external memory interface 265. The port filter 316 may include logic for determining policy information associated with the received data frames. For example, the port filter 316 may apply policy rules to the received data frames to identify one or more policy equations relating to the data frames. A policy equation may specify the type of processing to be given to a received data frame, such as whether the data frame should receive expedited, assured, or default processing or whether the data frame should be dropped or sent to a management device.

The action generator component 318, in conjunction with action tag generator 340, operates upon the result of the port filter 316 to generate an action tag for each of the received data frames. An action tag may, for example, specify the priority level that is to be associated with a data frame.

The output control queues 240 may include priority queues 350 associated with different priority levels. Each of the priority queues 350 may store a forwarding descriptor related to a data frame with the corresponding priority level. For clarity, FIG. 3 shows priority queues 350 associated with two priority levels: high and low priority. In other implementations consistent with the present invention, the number of priority levels and associated priority queues 350 may differ. For example, the priority levels may correspond to high, medium, and low priority levels or high, medium-high, medium-low, and low priority levels.

The registers 250 may include one or more registers programmed with priority levels that correspond to the priority queues 350. The host 160 may program the priority levels into the registers 250 via the host interface 260. The PVQ 235 may use the priority levels from the registers 250 to identify the appropriate priority queue 340 within the output control queues 240 to store the frame descriptors corresponding to data frames received by the switch 180.

Figure 4:
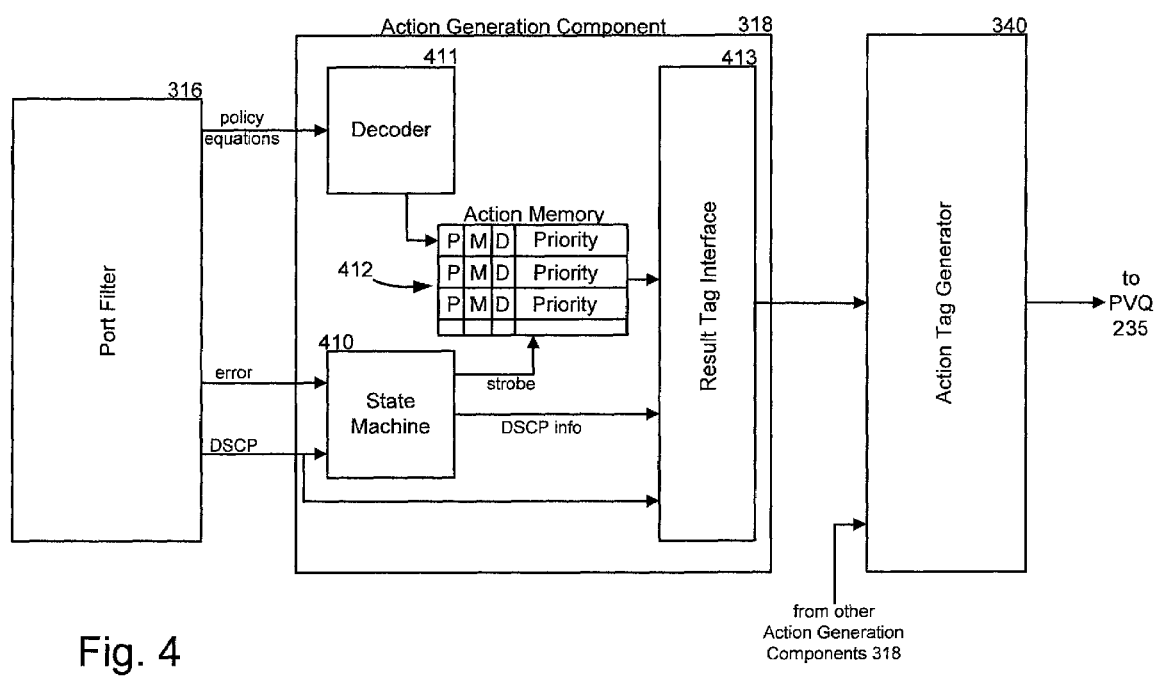
FIG. 4 is an exemplary diagram illustrating the action generation component of the multiport switch in more detail.

FIG. 4 is an exemplary diagram of action generation component 318, port filter 316, and action tag generator 340 according to an implementation consistent with the present invention. As shown in FIG. 4, action generation component 318 includes a state machine 410, a decoder 411, an action memory 412, and a result tag interface 413.

The action generator component 318 receives policy information from port filter 316. Based on the policy information, action generation component 318 generates tag information, which it transmits to action tag generator 340. With this information, action tag generator 340 generates a final action tag. PVQ 235 uses the action tag to determine how to process the corresponding data frame. The action tag generator 340 may also transmit a frame pointer that identifies the data frame within the external memory 170 to the PVQ 235.

Decoder 411 may be a 64-bit priority decoder. The decider 411 receives the policy information from port filter 316 as an identification of one or more applicable policy equations. In response, decoder 411 may select the highest priority policy equation (based on a predetermined programming of decoder 411) as the final match. Decoder 411 then outputs an address corresponding to the matched policy equation to action memory 412, which uses the address to output an action tag. For example, action memory 412 may be constructed as a table having 64 row entries, each corresponding to one of the 64 policy equations. Decoder 411 may output the number of the selected policy equation (i.e., 1-64), which directly addresses the appropriate row of action memory 412.

Figure 5:
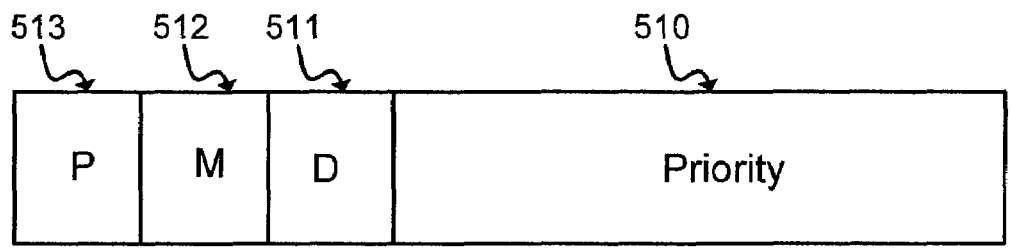
FIG. 5 is an exemplary diagram of an entry within the action memory of FIG. 3.

The action memory 412 may store information regarding the manner in which received data frames may be processed by the multiport switch 180. FIG. 5 is a diagram of an exemplary table entry 500 within the action memory 412 in an implementation consistent with the present invention. The entry 500 may include a priority field 310, a deny (D) field 511, a forward-to-management (M) field 512, and a priority (P) field 513. The 3-bit priority field 510 identifies which of eight priority levels the packet is to be given. The 1-bit deny field 512 may include data that identifies whether the data frame should be dropped. The 1-bit forward-to-management field 511 may include data that identifies whether the data frame should be transmitted to a management device, such as host 160. The 1-bit priority field 513 may indicate whether the priority field 510 contains valid data.

Returning to FIG. 4, result tag state machine 410 handles differential services information from port filter 316. Port filter 316 may, for example, transmit a 6-bit differentiated services code field ("DSCP") to state machine 410 that identifies the service requested by the data frame. If the data frame is not associated with a DSCP, port filter 316 transmits a DSCP field in which every bit is set to zero. State machine 410 may also receive an error signal from port filter 316, which indicates an error in the reception or processing of a packet's differential services information. Port filter 316 may extract the DSCP field for a data frame by snooping on bus 215 as data frames are transmitted from queuing logic 314 to external memory 170.

Upon receiving a data frame's DSCP field, state machine 410 activates the strobe line connected to action memory 412, which causes the action memory 412 to output the table entry indexed by decoder 411. The table entry is received by result tag interface 413. State machine 410 may also transmit the DSCP field information to result tag interface 413. Result tag interface 413, in response to receiving the DSCP field from state machine 410 and the table entry 500 from action memory 412, generates a complete action tag and forwards it to action tag generator 340. Action tag generator 340 receives the actions tags from each of the action generation components 318 and forwards them to PVQ 235. When forwarding the action tags to PVQ 235, action tag generator may append additional data relating to the data frame, such as a pointer that refers to the frame in external memory 170. The action tags from each of the action generation components 318 may be forwarded as a single stream of tags to PVQ 235.

Figure 6:
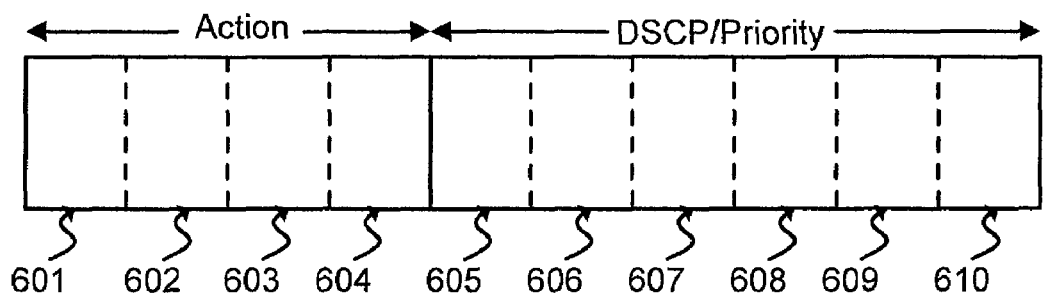
FIG. 6 is an exemplary diagram of an action tag.

FIG. 6 is a diagram of an exemplary action tag 600 received by action tag generator 340. The DSCP/priority field 605–610 may include data that identifies a service that is to be provided or a priority that is to be given to the data frame. The service provided to a packet may include a differentiated service, such as those described in K. Nichols, "Definition of the Differentiated Services Field (DS Field) in the IPv4 and IPv6 Headers," RFC2474, ftp://ftp.normos.org/ietf/rfc/rfc2474.txt, December 1998, and in S. Blake, "An Architecture for Differentiated Services," ftp://ftp.normos.org/ieff/rfc/rfc2475.txt, December 1998.

Fields 602–604 may contain the information from the deny field 511, forward to management field 512, and priority field 513, respectively. Additionally, field 601 may contain a bit indicating if fields 605–610 contain differential services information.

Table I, below, illustrates exemplary meanings of various configurations of the fields 605–610 when identifying a DSCP. Within the table, "class" refers to varying degrees of default data frame forwarding, "assured forwarding" refers to prioritized best effort data frame forwarding, and "expedited forwarding" refers to data frame forwarding with the lowest level of latency, packet loss, and delay variation.

TABLE I

| DSCP Data (bits 605–610) | Meaning |
| --- | --- |
| 0 0 0 0 0 0 | CS0: default forwarding class 0 |
| 0 0 1 0 0 0 | CS1: default forwarding class 1 |
| 0 1 0 0 0 0 | CS2: default forwarding class 2 |
| 0 1 1 0 0 0 | CS3: default forwarding class 3 |
| 1 0 0 0 0 0 | CS4: default forwarding class 4 |
| 1 0 1 0 0 0 | CS5: default forwarding class 5 |
| 1 1 0 0 0 0 | CS6: default forwarding class 6 |
| 1 1 1 0 0 0 | CS7: default forwarding class 7 |
| 0 0 1 0 1 0 | AF11: assured forwarding class 11 |
| 0 0 1 1 0 0 | AF12: assured forwarding class 12 |
| 0 0 1 1 1 0 | AF13: assured forwarding class 13 |
| 0 1 0 0 1 0 | AF21: assured forwarding class 21 |
| 0 1 0 1 0 0 | AF22: assured forwarding class 22 |
| o 1 0 1 1 0 | AF23: assured forwarding class 23 |
| 0 1 1 0 1 0 | AF31: assured forwarding class 31 |
| 0 1 1 1 0 0 | AF32: assured forwarding class 32 |
| 0 1 1 1 1 0 | AF33: assured forwarding class 33 |
| 1 0 0 0 1 0 | AF41: assured forwarding class 41 |
| 1 0 0 1 0 0 | AF42: assured forwarding class 42 |
| 1 0 0 1 1 0 | AF43: assured forwarding class 43 |
| 1 0 1 1 1 0 | EF PHB: expedited forwarding class |

Table II, below, illustrates exemplary meanings of various configurations of the fields 605–610 when identifying a priority.

TABLE II

| Priority Data (bits 605–610) | Meaning |
| --- | --- |
| 0 0 0 0 0 0 | Priority 0 (TOS0) |
| 0 0 0 0 0 1 | Priority 1 (TOS1) |
| 0 0 0 0 1 0 | Priority 2 (TOS2) |
| 0 0 0 0 1 1 | Priority 3 (TOS3) |
| 0 0 0 1 0 0 | Priority 4 (TOS4) |
| 0 0 0 1 0 1 | Priority 5 (TOS5) |
| 0 0 0 1 1 0 | Priority 6 (TOS6) |
| 0 0 0 1 1 1 | Priority 7 (TOS7) |

Exemplary Processing

Figure 7:
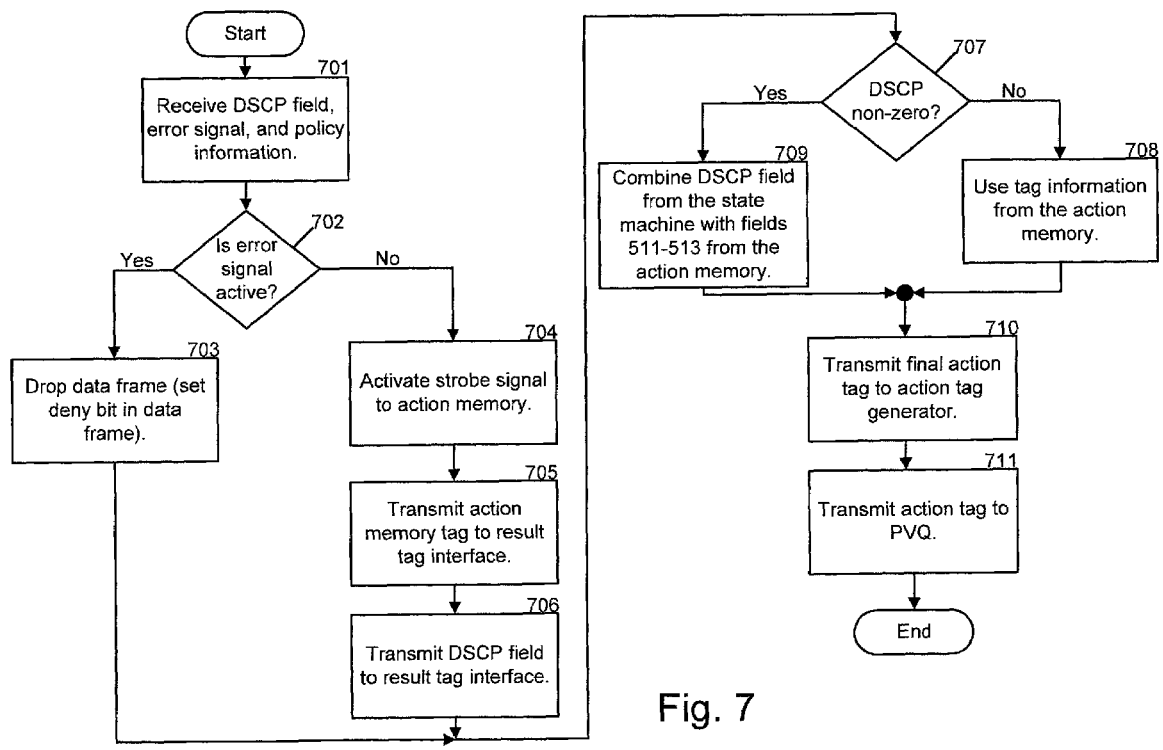
FIG. 7 is a flowchart of exemplary processing for the operation of the port filter and action generator of the multiport switch of FIG. 2.

FIG. 7 is a flow chart illustrating operation of port filter 316, action generator component 318, and action generator 340 in more detail. To begin, port filter 316 may output the DSCP field, an error signal, and policy information to action generation component 318. (Act 701). If the error signal indicates an error, state machine 410 initiates a drop operation on the received data frame. (Acts 702 and 703). Otherwise, state machine 410 activates the strobe signal to action memory 412. (Act 704). In response, action memory 412 outputs the table entry indexed by decoder 411 to result tag interface 413. (Act 705). State machine 410 forwards its received DSCP field to result tag interface 413. (Act 706).

A zero value in the DSCP field indicates that the data frame is not using differential services. In this situation, result tag interface 413 forwards the entry from action memory 412 to action tag generator 340. (Acts 707 and 708). The data frame's priority is thus determined by the policy equations from port filter 316. If the DSCP field is non-zero, however, result tag interface 413 copies fields 511–513 from table entry 500 into action tag fields 602–604 to complete the action tag 600. (Act 707 and 709). Result tag interface 413 transmits the completed action tag to action tag generator 340, which forwards the action tag to PVQ 235. (Acts 710 and 711). In this manner, port filter 316, action generation component 318, and action tag generator 340 operate to generate the action tag based on policy information and differential services class information.

As described above, mechanisms within a multiport switch efficiently handles the forwarding of data packets that may be associated with multiple forwarding rules, such as policy rules programmed into the multiport switch or differential services class information within the packet.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 7, the order of the acts may differ in other implementations consistent with the present invention.

What is claimed is:

1. A network device for forwarding information in a network, the network device comprising:

a plurality of input ports configured to receive a plurality of data frames;

a port filter configured to generate policy information and class of service information for each of the received data frames;

a memory storing action tags corresponding to the policy information;

a result tag interface configured to generate a final action tag for each of the received data frames based on the class of service information and the action tag corresponding to the received data frame; and a decoder configured to receive the policy information from the port filter, select a highest priority policy equation indicated by the policy information, and output an address signal to the memory corresponding to the highest priority policy equation.

2. The network device of claim 1, wherein the decoder is a priority decoder.

3. A network device for forwarding information in a network, the network device comprising:

a plurality of input ports configured to receive a plurality of data frames;

a port filter configured to generate policy information and class of service information for each of the received data frames;

a memory storing action tags corresponding to the policy information;

a result tag interface configured to generate a final action tag for each of the received data frames based on the class of service information and the action tag corresponding to the received data frame; and a state machine coupled to the port filter and the memory, the state machine being configured to receive the class of service information and activating the memory to read out a stored action tag in response to receiving the class of service information.

4. The network device of claim 3, wherein the port filter additionally generates an error signal, the state machine receiving the error signal, and based on the error signal, determining whether the class of service information contains an error.

5. The network device of claim 1, further comprising:
an action tag generator configured to receive final action tags from multiple result tag interfaces and to output the received final action tags as a single stream of final action tags.

6. The network device of claim 5, further comprising:
a plurality of output ports for transmitting the received data frames based on the final action tags transmitted from the action tag generator.

7. The network device of claim 6, further comprising:
a plurality of priority queues associated with each of a plurality of output ports of the network device.

8. The network device of claim 1, wherein each of the final action tags includes:
a differentiated services code point (DSCP)/priority field configured to store one of DSCP data or priority data relating to one of the classes of service,
a deny field configured to store data indicating whether to drop a corresponding one of the received data frames,
a forward-to-management field configured to store data indicating whether to forward the corresponding data frame to a management device,
a priority field configured to store data indicating whether the DSCP/priority field stores valid priority data, and
a DSCP field configured to store data indicating whether the DSCP/priority field stores valid DSCP data.

9. A method for identifying priority level information for a data frame received by a network device, comprising:
programming a memory with priority level information corresponding to a plurality of priority levels based on network policy equations;
receiving a plurality of data frames;
accessing the memory to identify the priority level information associated with each of the received data frames;
extracting a differentiated services code point (DSCP) data from each of the received data frames;
generating a final action tag for the received data frames based on the DSCP data and the priority level information; and
transmitting the data frames from the network device based on the generated final action tag.

10. The method of claim 9, wherein each of the final action tags includes:
a differentiated services code point (DSCP)/priority field configured to store one of DSCP data or priority data relating to one of the classes of service,
a deny field configured to store data indicating whether to drop a corresponding one of the received data frames,
a forward-to-management field configured to store data indicating whether to forward the corresponding data frame to a management device,
a priority field configured to store data indicating whether the DSCP/priority field stores valid priority data, and
a DSCP field configured to store data indicating whether the DSCP/priority field stores valid DSCP data.

11. The method of claim 10, further comprising:
receiving, for each of the data frames, a signal that indicates whether the data frame contains an error; and
setting the deny field to indicate that the data frame should be dropped when the signal indicates an error is present in the data frame.

12. The method of claim 9, wherein, for each particular one of the data frames, the memory is accessed at an address determined by policy equations relating to the particular one of the data frames.

13. The method of claim 9, further including:
using the DSCP data in the final action tag when the received DSCP data has a non-zero value; and
using the priority level information accessed from the memory in the final action tag when the received DSCP field has a zero value.

14. A system comprising:
a first-in-first-out buffer for receiving data frames in a packet-based network;
a port filter for generating policy information and class of service information for the received data frames, the policy information for a particular one of the data frames including information relating to a priority level that the particular one of the data frames should be given;
an action generator component for selecting one of the priority level from the policy information and the class of services information for each of the data frames, and generating a final action tag based on the selection; and
output ports for transmitting the data frames based on the final action tags of the data frames.

15. The system of claim 14, wherein each of the final action tags includes:
a differentiated services code point (DSCP)/priority field configured to store one of DSCP data or priority data relating to one of the classes of service,
a deny field configured to store data indicating whether to drop a corresponding one of the data frames,
a forward-to-management field configured to store data indicating whether to forward the corresponding data frame to a management device,
a priority field configured to store data indicating whether the DSCP/priority field stores valid priority data, and
a DSCP field configured to store data indicating whether the DSCP/priority field stores valid DSCP data.

16. The system of claim 14, wherein the action generator component further includes:
a memory for storing action tags corresponding to the priority level of the policy information.

17. The system of claim 16, wherein the action generator component further includes:
a decoder for receiving policy information from the port filter, the decoder selecting a highest priority policy equation indicated by the policy information and outputting an address signal to the memory corresponding to the highest priority policy equation.

18. The system of claim 17, wherein the action generator component further includes:
a result tag interface that uses the class of services information in the final action tag when the class of services information has a non-zero value and uses the priority level accessed from the memory in the final action tag when the class of services information has a zero value.

19. The system of claim 14, further comprising:
an action tag generator for receiving final action tags from multiple action generation components and outputting the received final action tags as a single stream of final action tags to the output ports.

* * * * *